(12) United States Patent
Cavello et al.

(10) Patent No.: US 8,109,483 B2
(45) Date of Patent: Feb. 7, 2012

(54) SWIVEL SUPPORT BASE APPARATUS

(75) Inventors: Christopher Cavello, Austin, TX (US);
Paul Drew, The Woodlands, TX (US);
Mark Ruch, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2174 days.

(21) Appl. No.: 10/728,674

(22) Filed: Dec. 5, 2003

(65) Prior Publication Data
US 2005/0121583 A1   Jun. 9, 2005

(51) Int. Cl.
*A47B 91/00* (2006.01)
(52) U.S. Cl. ............ 248/349.1; 248/346.01; 248/918
(58) Field of Classification Search ............ 248/371,
248/349.01, 917, 918, 919, 346.01, 131,
248/372.1, 186.1; 108/97, 103
See application file for complete search history.

(56) References Cited

U.S. PATENT DOCUMENTS

| | | | | |
|---|---|---|---|---|
| 155,101 A * | 9/1874 | Mortimer | ............... | 248/458 |
| 1,506,669 A * | 8/1924 | Sabiston | ............... | 108/94 |
| 1,532,728 A * | 4/1925 | Brobst | ............... | 104/44 |
| 2,264,128 A * | 11/1941 | Branch | ............... | 108/139 |
| 2,680,660 A * | 6/1954 | Stephens | ............... | 108/94 |
| 3,854,404 A * | 12/1974 | Janda | ............... | 104/44 |
| 3,860,307 A * | 1/1975 | Fostel | ............... | 312/249.4 |
| 4,720,140 A * | 1/1988 | Change, III | ............... | 297/217.7 |
| 5,833,316 A * | 11/1998 | Hsieh | ............... | 297/344.21 |
| 6,467,746 B1 * | 10/2002 | Paskiewicz | ............... | 248/349.1 |
| 6,550,402 B1 * | 4/2003 | Stone et al. | ............... | 108/91 |

\* cited by examiner

*Primary Examiner* — Amy J Sterling

(57) ABSTRACT

A swivel support base apparatus is disclosed. One embodiment of the swivel support base apparatus includes a frame, a swivel mechanism, said swivel mechanism including a foot having a defined frictional coefficient that enables rotation of the frame and impedes translational movement of the foot, and secondary feet connected to the frame and disposed in locations surrounding the swivel mechanism, said secondary feet having a lower frictional coefficient than the foot.

13 Claims, 4 Drawing Sheets

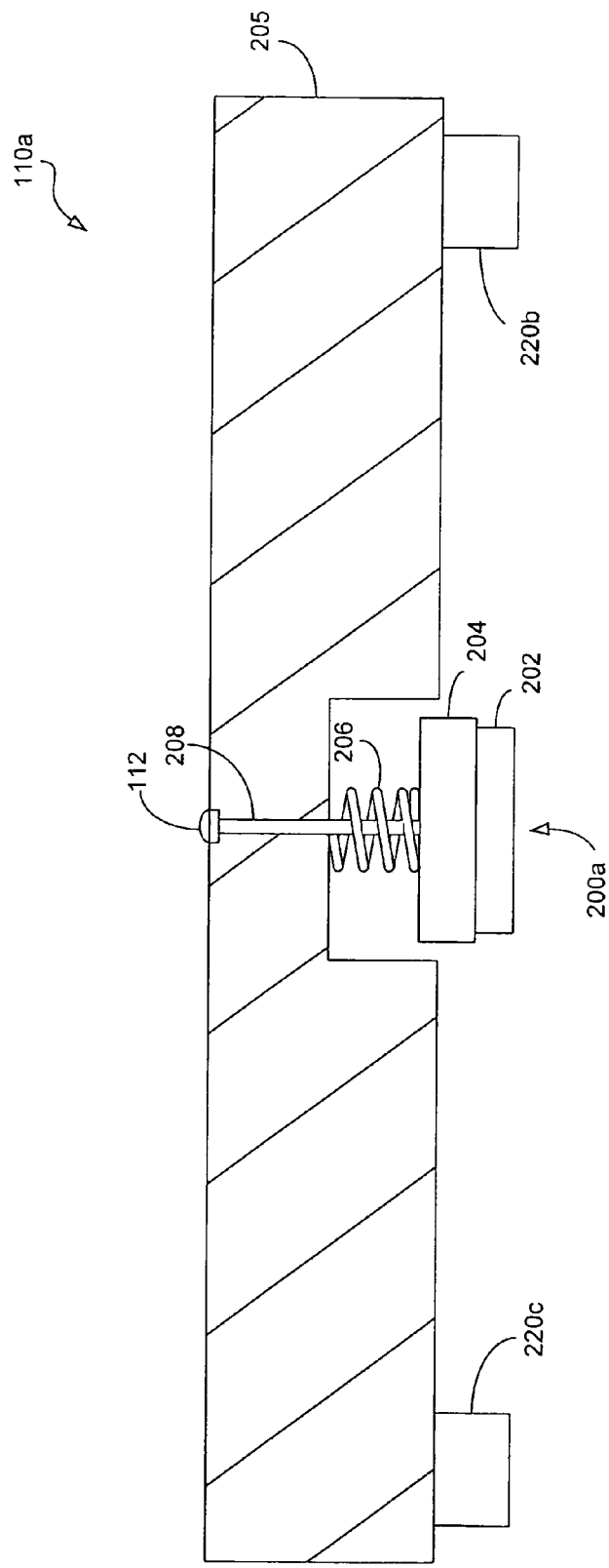

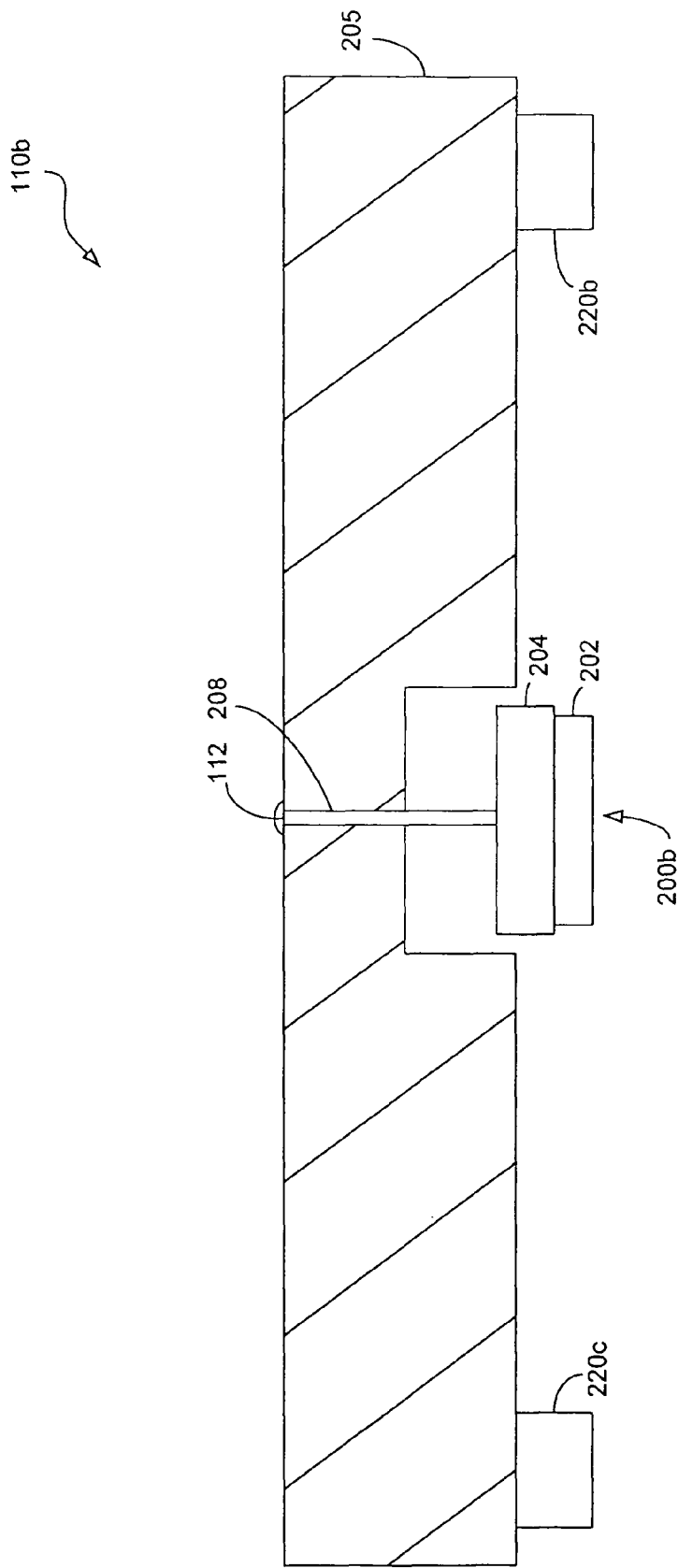

SWIVEL SUPPORT BASE APPARATUS

BACKGROUND

Furniture, electronic equipment, and desktop products, such as computer terminals, computer displays, organizers, etc., sometimes feature a support that includes a swiveling mechanism. The swiveling mechanism can be implemented in several ways, including through the use of ball-bearings or plastic-parts that slide against other plastic parts. Such swiveling mechanisms can be complex, and often provide for swivel characteristics that are not smooth. Lazy-susan-type devices are also known, but are often constructed with complex ball-bearing mechanisms to bear the entire weight of the product.

SUMMARY

One embodiment of the invention, among others, comprises a swivel support base apparatus that includes a frame, a swivel mechanism, said swivel mechanism including a foot having a defined frictional coefficient that enables rotation of the frame and impedes translational movement of the foot, and secondary feet connected to the frame and disposed in locations surrounding the swivel mechanism, said secondary feet having a lower frictional coefficient than the foot.

BRIEF DESCRIPTION OF THE DRAWINGS

The components in the drawings are not necessarily to scale, emphasis instead being placed upon clearly illustrating the principles of the present invention. Moreover, in the drawings, like reference numerals designate corresponding parts throughout the several views.

FIG. 3A is a front cross-sectional elevation view along line A-A of an embodiment of the swivel support base shown in FIG. 2.

FIG. 3B is a front cross-sectional elevation view along line A-A of another embodiment of the swivel support base shown in FIG. 2.

DETAILED DESCRIPTION

Disclosed herein are various embodiments of a swivel support base. The swivel support base can provide support for products, such as displays, organizers, devices, furniture, etc. with the ability to swivel (e.g., rotate left and right). The swivel support base can be detachable from such products or integrated (e.g., permanently affixed with or without replacement parts) with the product. In general, the swivel support base includes a swivel mechanism disposed at the bottom of the support base frame. The swivel mechanism includes a primary foot that has a no-slip pad in contact with the supporting surface, such as a desktop or floor. The no-slip pad can be comprised of a material that provides a defined frictional coefficient (e.g., coefficient of friction) to prevent or hinder translational motion across the supporting surface, and is located in-line with the center of gravity of the supported product. In one embodiment, the coefficient of friction for the primary foot is larger than the combined coefficient of friction for the combined secondary feet. Two or more additional feet (referred to herein as secondary feet) can be located at the bottom of the base frame and disposed at positions at defined distances from the primary foot (e.g., extending outward in a direction toward the periphery of the base frame). The secondary feet can be comprised of a material that has a lower coefficient of friction than the primary foot, providing a low resistance to rotation of the supported product. When force is applied to the supported product at either side of the centerline of an axis defined by the primary foot (e.g., as if rotating a desktop display screen to provide a better view of the screen), the supported product easily rotates around the primary foot axis of rotation. However, when force is applied directly at the axis of rotation defined by the primary foot (e.g., as if to push or slide the desktop product across the supporting surface), slippage on the supporting surface is prevented or substantially impaired.

Figure 1:
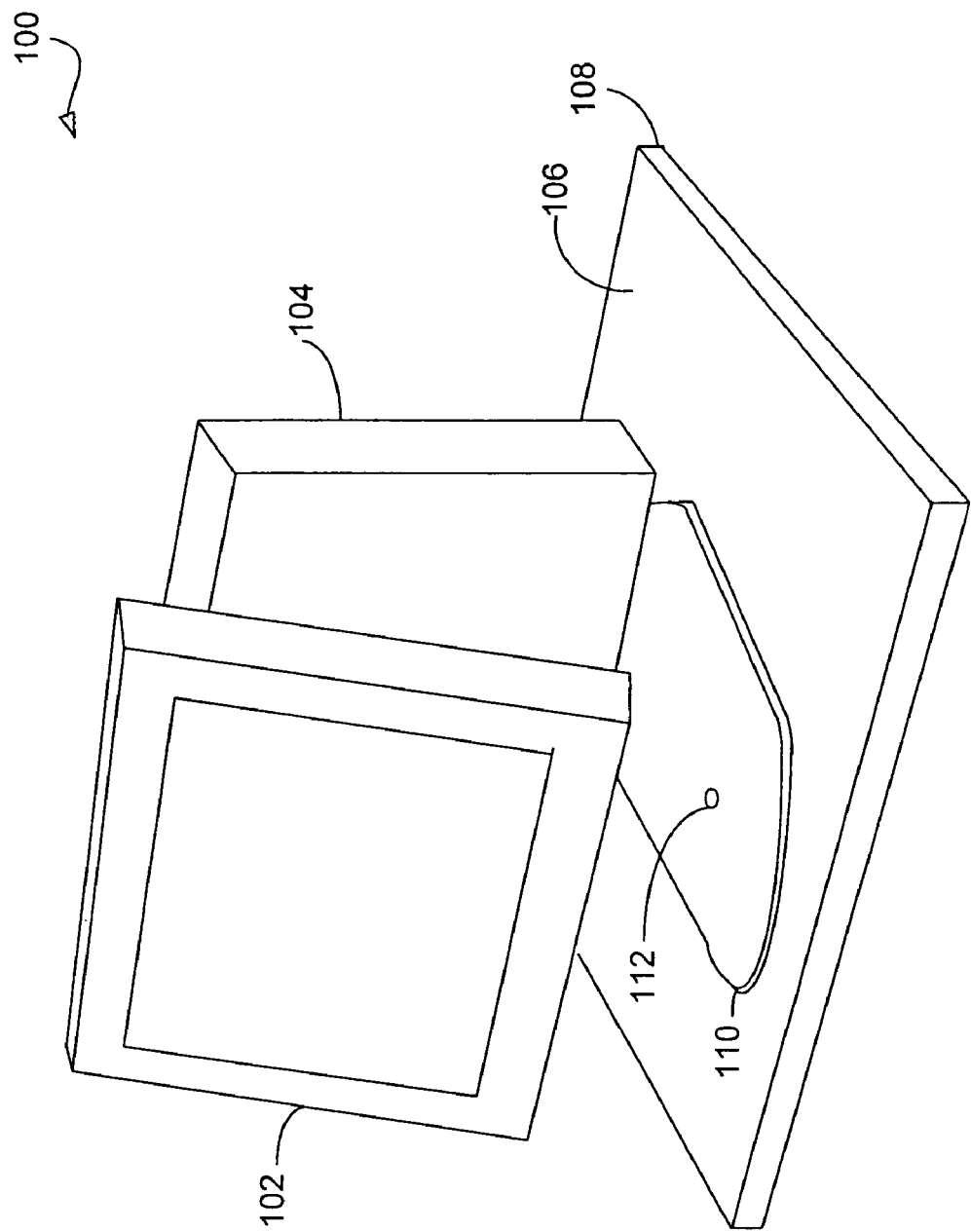
FIG. 1 is a schematic diagram of an example implementation for a swivel support base according to an embodiment of the invention.
Figure 2:
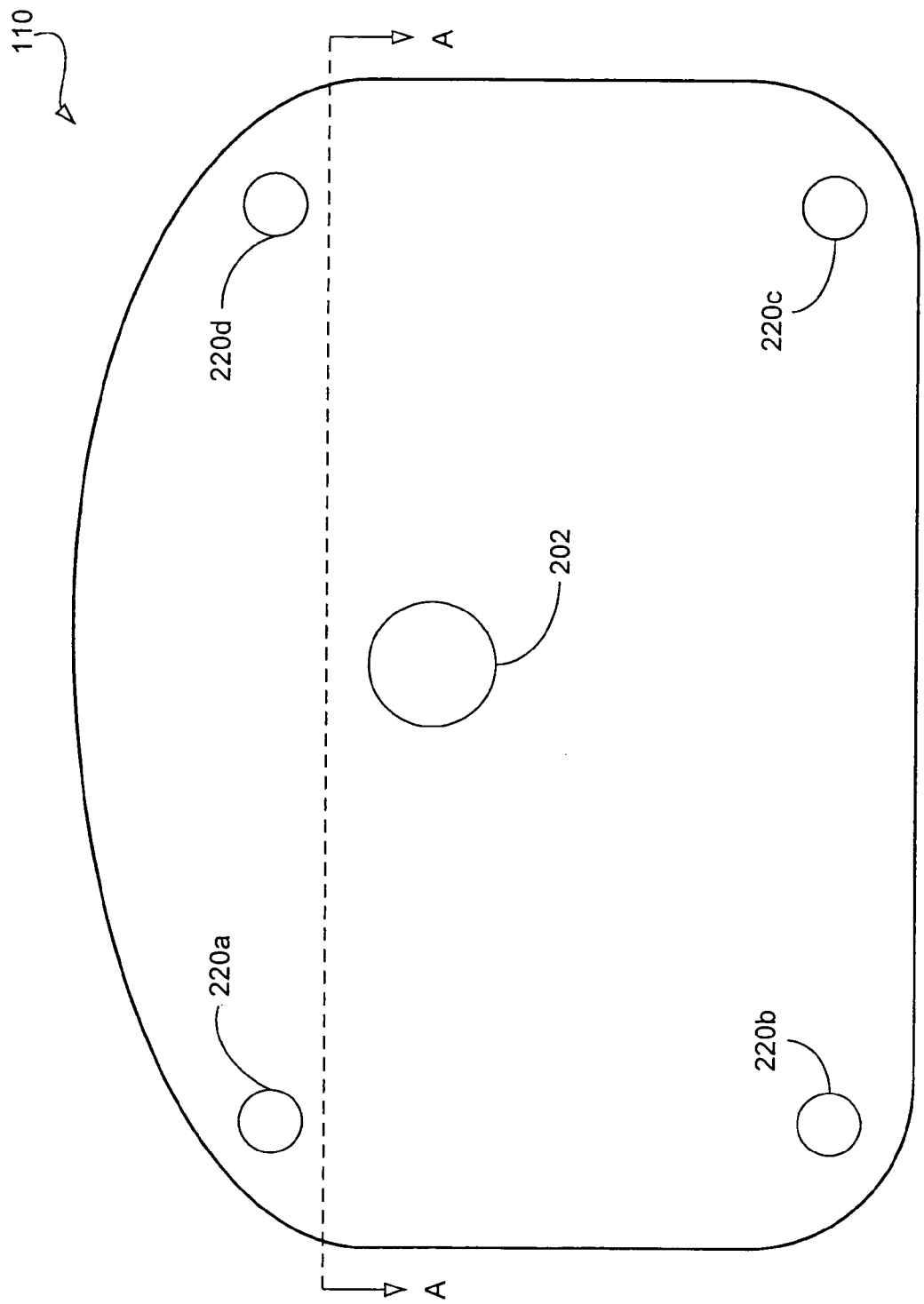
FIG. 2 is a bottom plan view of the swivel support base shown in FIG. 1.

In the description that follows, an example desktop product comprising a computer display terminal is provided in FIG. 1 to illustrate an example implementation for the swivel support base. FIG. 2 provides an example bottom plan view to show the primary foot and secondary feet that cooperate to provide a smooth swivel motion and low-slip characteristics for the desktop product. Finally, two embodiments are illustrated in FIGS. 3A and 3B to further illustrate the swivel support base.

FIG. 1 is a schematic diagram of an example implementation for a swivel support base. In particular, FIG. 1 shows an example desktop product in the form of a computer workstation 100 resting on the upper surface 106 of a desk 108. The computer workstation 100 includes a display terminal 102 and a computer 104 attached to the display terminal in a known manner. The computer workstation 100 can be mounted to the swivel support base 110 using a molded assembly, bracketing, a combination thereof, or other known coupling mechanisms. The computer workstation 100 is swivel-supported by the swivel support base 110. The swivel support base 110 includes a screw head 112 extending from the top surface of the swivel support base 110, and in one embodiment is used to attach an axle (not shown) of a swivel mechanism (not shown) to the swivel support base 110. The screw head 112, in one embodiment, provides an engagement point by which rotational motion of the computer workstation 100 is translated to rotational motion of the swivel mechanism. The swivel support base 110 enables the computer workstation 100 to rotate up to 360 degrees on the upper surface 106 of the desk 108 in a smooth and continuous manner. Further, the swivel support base 110 prevents or significantly impairs the ability of a user to slide the computer workstation 100 across the upper surface 106. As will be described below, the swivel support base 110 achieves this performance using a low complexity swivel mechanism in cooperation with secondary feet to support the weight of the computer workstation 100 as the computer workstation is rotated.

It will be understood that the computer workstation is one example implementation among many, and that other products such as lamps, organizers, entertainment equipment, electronic devices, and furniture can benefit from the swivel support base whether used on a desk, floor, or other supporting surfaces.

FIG. 2 is a bottom plan view of the swivel support base 110 shown in FIG. 1. It will be understood that other geometric configurations for the swivel support base 110 are contemplated, as well as other bottom surface features and components. The swivel support base 110 includes a primary foot 202 and secondary feet 220*a-d*. Although four secondary feet 220*a-d* are shown, it will be understood that fewer or greater secondary feet can be used in some embodiments. As noted above, the primary foot 202 is located along an axis defining the center of gravity of the supported product. The secondary feet 220a-d are located to provide stability to the supported product, and in this embodiment, are located in positions towards the periphery of the swivel support base 110. The primary foot 202 is comprised of a material having a defined frictional coefficient that is greater than the material used for the secondary feet 220a-d. Exemplary materials for the primary foot 202 include elastomeric materials such as rubber (e.g., urethane rubber, silicon rubber, etc.), or cork, among other materials that provide a resistance to slippage of the supported workstation 100 (FIG. 1). Similarly, the secondary feet 220a-d are comprised of an elastomeric material that enables the supported product to swivel in a low resistance manner. The primary foot 202 and the secondary feet 220a-d provide clearance between the supporting surface (e.g., upper surface 106 of the desktop 108) and the lower frame surface of the swivel support base 110. FIGS. 3A and 3B further illustrate the clearance provided by the primary foot 202 and the secondary feet 220a-d, among other features.

FIG. 3A is a front cross-sectional elevation view along line A-A of an embodiment of the swivel support base shown in FIG. 2. In this view, two of the secondary feet 220c and 220b are shown, and a more detailed illustration of a swivel mechanism 200a of the swivel support base 110a is also illustrated. The swivel mechanism 200a includes the primary foot 202, a disk 204 to which the primary foot is fixably mounted, a spring 206, and an axle 208 disposed within the center of the spring 206 and engaged with the screw head 112 at the top surface of the swivel support base 110a. The location of the swivel mechanism 200a is such that the majority of the weight of the supported structure (e.g., computer workstation 100) is supported by the swivel mechanism 200a.

The primary foot 202 is fixably mounted to the disk 204 in a known manner, according to one embodiment. The disk 204 can be comprised of metal and/or plastic, among other materials, and can be cast, molded, punched, or formed according to other well-known methods. In some embodiments, the foot 202 can be slidably attached (e.g., slidable with respect to the disk 204 in the vertical direction) to the disk 204 to provide a spring effect. Additionally, in some embodiments the primary foot 202 can be detachable and thus replaceable.

In one embodiment, the axle 208 is configurably fitted (e.g., press-fitted) into a cavity (not shown) in the disk 204, and is dimensioned to rotate within the cavity. The depth dimension of the cavity is not critical. In such a configuration, there is limited or no rotational movement of the primary foot 202 during rotation of the computer workstation 100 (FIG. 1), and the rotation of the computer workstation 100 is substantially coincident with the rotation of the axle 208. In some embodiments, the axle 208 can be fixably attached to the disk 204, according to known methods, such that rotation of the computer workstation 100 and the axle 208 is coincident with the primary foot 202 and other components of the swivel mechanism 200a.

Additionally, the axle 208 is configured to extend into the body or frame 205 of the swivel support base 110a and terminated at the screw head 112 at the top surface of the swivel support base 110a. Surrounding the axle 208 is a spring 206 having a defined spring constant based on the anticipated weight to be supported. For example, the spring constant is chosen to enable a gap between the bottom surface of the frame 205 and the top surface of the disk 204 when loaded with the computer workstation 100 (FIG. 1).

In operation, the computer workstation 100 rests on top of the swivel support base 110a, the swivel support base being an integral part of the workstation 100 or detachably connected to the workstation. The weight of the computer workstation 100 causes compression of the primary foot 202, which in cooperation with the no-slip surface of the primary foot 202 enables little to no translational motion or slippage on the upper surface 106 (FIG. 1) of the desk 108 (FIG. 1). The computer workstation 100 is supported primarily by the spring 206 and to a lesser extent by the secondary feet 220a-d (FIG. 2). A user who desires to rotate the computer workstation 100 applies a force a distance offset from the centerline of the axle 208 (e.g., pushing at one end of the display terminal 102 (FIG. 1), which overcomes the frictional resistance of the secondary feet 220a-d to cause the display terminal 102 to rotate accordingly, while the frictional resistance provided by the primary foot 202 resists translational motion along the upper surface 106 (FIG. 1) of the desk 108. Thus, the foot can rotate independent of the axle, or it can rotate with the axle, which would rotate.

FIG. 3B is a front cross-sectional elevation view along line A-A of another embodiment of the swivel support base shown in FIG. 2. The example swivel support base 110b includes a swivel mechanism 200b and secondary feet, such as secondary feet 220b and 220c as shown. The swivel mechanism 200b includes a primary foot 202, a disk 204, an axle 208, and screw head 112 in the same configuration as described in association with FIG. 3A. However, the swivel mechanism 200b according to this embodiment does not have a spring, but relies on the compression of the primary foot in lieu of the spring. That is, a separate spring element is not necessary, as the spring effect can be achieved through geometric or structural elements of the design. For example, in some embodiments, the primary foot 202 can be configured with a larger diameter to allow the necessary flexure.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. An apparatus, comprising:
   a frame;
   a swivel mechanism, said swivel mechanism including a foot having a foot pad of a defined frictional coefficient in contact with a support surface, the foot pad configured with a material that enables rotation of the frame and impedes translational movement of the foot, wherein the swivel mechanism includes a disk connected to the foot; and
   secondary feet connected to the frame and disposed in locations surrounding the swivel mechanism, said secondary feet each having a pad of a lower frictional coefficient than the foot pad, wherein said secondary feet pads are configured with a material that enables rotation of the frame when supporting a device on the frame.

2. The apparatus of claim 1, wherein the foot is fixably attached to the disk.

3. The apparatus of claim 1, wherein the foot is detachable from the disk.

4. The apparatus of claim 1, wherein the swivel mechanism includes an axle in contact with the disk and secured to the frame with a screw head.

5. The apparatus of claim 4, wherein the axle is fixably attached to the disk.

6. The apparatus of claim 4, wherein the axle is configurably coupled to the disk and rotatable with respect to the disk.

7. The apparatus of claim 4, wherein the swivel mechanism includes a spring at least partially surrounding the axle, the spring supporting the frame.

8. An apparatus, comprising:
a frame;
a swivel mechanism, said swivel mechanism including a foot having a foot pad of a defined frictional coefficient in contact with a support surface, the foot pad configured with a material that enables rotation of the frame and impedes translational movement of the foot; and
secondary feet connected to the frame and disposed in locations surrounding the swivel mechanism, said secondary feet each having a pad of a lower frictional coefficient than the foot pad, wherein said secondary feet pads are configured with a material that enables rotation of the frame when supporting a device on the frame, wherein said secondary feet are designed to share a load imposed upon the frame with the foot.

9. The apparatus of claim 8, wherein the foot supports the majority of the load.

10. An apparatus, comprising:
a frame;
a swivel mechanism, said swivel mechanism including a foot having a foot pad of a defined frictional coefficient in contact with a support surface, the foot pad configured with a material that enables rotation of the frame and impedes translational movement of the foot; and
secondary feet connected to the frame and disposed in locations surrounding the swivel mechanism, said secondary feet each having a pad of a lower frictional coefficient than the foot pad, wherein said secondary feet pads are configured with a material that enables rotation of the frame when supporting a device on the frame, wherein the apparatus includes the device disposed on the frame.

11. The apparatus of claim 10, wherein the device includes a computer display monitor.

12. The apparatus of claim 1, wherein the material of the secondary feet pads include at least one of an elastomeric material and cork.

13. The apparatus of claim 1, wherein the material of the foot pad includes at least one of an elastomeric material and cork.

\* \* \* \* \*